United States Patent
Park et al.

(10) Patent No.: US 8,360,785 B2
(45) Date of Patent: Jan. 29, 2013

(54) SYSTEM FOR MANAGING PHYSICAL TRAINING AND METHOD THEREOF

(75) Inventors: Duck-Gun Park, Daejeon (KR); Youn-Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 944 days.

(21) Appl. No.: 12/443,409

(22) PCT Filed: Feb. 27, 2007

(86) PCT No.: PCT/KR2007/001004
§ 371 (c)(1),
(2), (4) Date: Mar. 27, 2009

(87) PCT Pub. No.: WO2008/038868
PCT Pub. Date: Apr. 3, 2008

(65) Prior Publication Data
US 2010/0015586 A1     Jan. 21, 2010

(30) Foreign Application Priority Data
Sep. 29, 2006  (KR) .................. 10-2006-0096460
Feb. 27, 2007  (KR) .................. 10-2007-0019627

(51) Int. Cl.
    *A63B 69/00*    (2006.01)
(52) U.S. Cl. ............ 434/247; 434/258; 434/262; 482/1; 482/4; 482/5; 482/6; 482/7; 482/8; 482/51; 482/900; 600/300; 600/301
(58) Field of Classification Search .................. 434/247, 434/258, 262; 482/1, 4, 8–9, 51, 900; 600/300, 600/301
See application file for complete search history.

(56) References Cited

U.S. PATENT DOCUMENTS

| 5,839,901 A |   | 11/1998 | Karkanen |
|---|---|---|---|
| 5,941,837 A |   | 8/1999 | Amano et al. |
| 6,447,424 B1 | * | 9/2002 | Ashby et al. ................ 482/8 |
| 6,458,060 B1 | * | 10/2002 | Watterson et al. ............ 482/54 |
| 6,997,852 B2 | * | 2/2006 | Watterson et al. ............ 482/1 |

(Continued)

FOREIGN PATENT DOCUMENTS

| KR | 1019990066565 A | 8/1999 |
|---|---|---|
| KR | 1020000006830 A | 2/2000 |

(Continued)

OTHER PUBLICATIONS

Asker Jeukendrup et al., "Heart rate monitoring during training and competition in cyclists," Journal of Sports Sciences, 1998, pp. S91-S99.

(Continued)

*Primary Examiner* — Jack Yip

(57) ABSTRACT

A system for managing physical training includes: a goal achievement planning module establishing a training goal and a time schedule for a physical training participant on the basis of a profile reflecting physical characteristics of the physical training participant; a section creation module separately creating training items on a section basis according to the training goal and the time schedule of the physical training participant with reference to a predetermined standard; and a management contents creation module creating contents required to manage the physical training of the physical training participant on the basis of physical measurements previously established by the goal achievement planning module and the section creation module and various physical measurements measured from sensors attached to the physical training participant in real-time.

6 Claims, 14 Drawing Sheets

U.S. PATENT DOCUMENTS

| | | | |
|---|---|---|---|
| 7,054,678 | B2 | 5/2006 | Dardik et al. |
| 7,060,006 | B1 * | 6/2006 | Watterson et al. ............... 482/54 |
| 7,166,062 | B1 * | 1/2007 | Watterson et al. ................ 482/8 |
| 7,455,622 | B2 * | 11/2008 | Watterson et al. ................ 482/8 |
| 7,480,512 | B2 * | 1/2009 | Graham et al. ............ 455/456.3 |
| 7,628,730 | B1 * | 12/2009 | Watterson et al. ................ 482/8 |
| 7,645,212 | B2 * | 1/2010 | Ashby et al. ....................... 482/8 |
| 7,789,800 | B1 * | 9/2010 | Watterson et al. ................ 482/8 |
| 2002/0016235 | A1 * | 2/2002 | Ashby et al. ....................... 482/8 |
| 2002/0022551 | A1 * | 2/2002 | Watterson et al. ................ 482/8 |
| 2002/0107433 | A1 * | 8/2002 | Mault ........................... 600/300 |
| 2005/0209052 | A1 * | 9/2005 | Ashby et al. ....................... 482/9 |
| 2005/0250458 | A1 * | 11/2005 | Graham et al. ............... 455/121 |
| 2006/0205566 | A1 * | 9/2006 | Watterson et al. ................ 482/8 |
| 2007/0033068 | A1 * | 2/2007 | Rao et al. ........................... 705/2 |
| 2007/0033069 | A1 * | 2/2007 | Rao et al. ........................... 705/2 |
| 2007/0042868 | A1 * | 2/2007 | Fisher et al. ...................... 482/8 |

FOREIGN PATENT DOCUMENTS

| | | |
|---|---|---|
| KR | 1020010044452 A | 6/2001 |
| KR | 1020010070845 A | 7/2001 |
| KR | 1020020065441 A | 8/2002 |
| KR | 1020030067234 A | 8/2003 |
| KR | 1020040106648 A | 12/2004 |

OTHER PUBLICATIONS

Masakazu Asano et al., "Development of an Exercise Meter using Triaxial Acceleration Data," Proceedings of the 2005 IEEE Engineering in Medicine and Biology 27th Annual Conference, Sep. 1-4, 2005.

Carl Foster et al., "A New Approach to Monitoring Exercise Training," Journal of Strength and Conditioning Research, 2001, pp. 109-115.

Duck Gun Park et al., "Development of Professional Athlete Monitoring System," WC 2006 World Congress on Medical Physics and Biomedical Engineering, Aug. 27-Sep. 1, 2006.

International Search Report for application PCT/KR2007/001004 filed Feb. 27, 2007.

Written Opinion of the International Searching Authority for application PCT/KR2007/001004 filed Feb. 27, 2007.

* cited by examiner

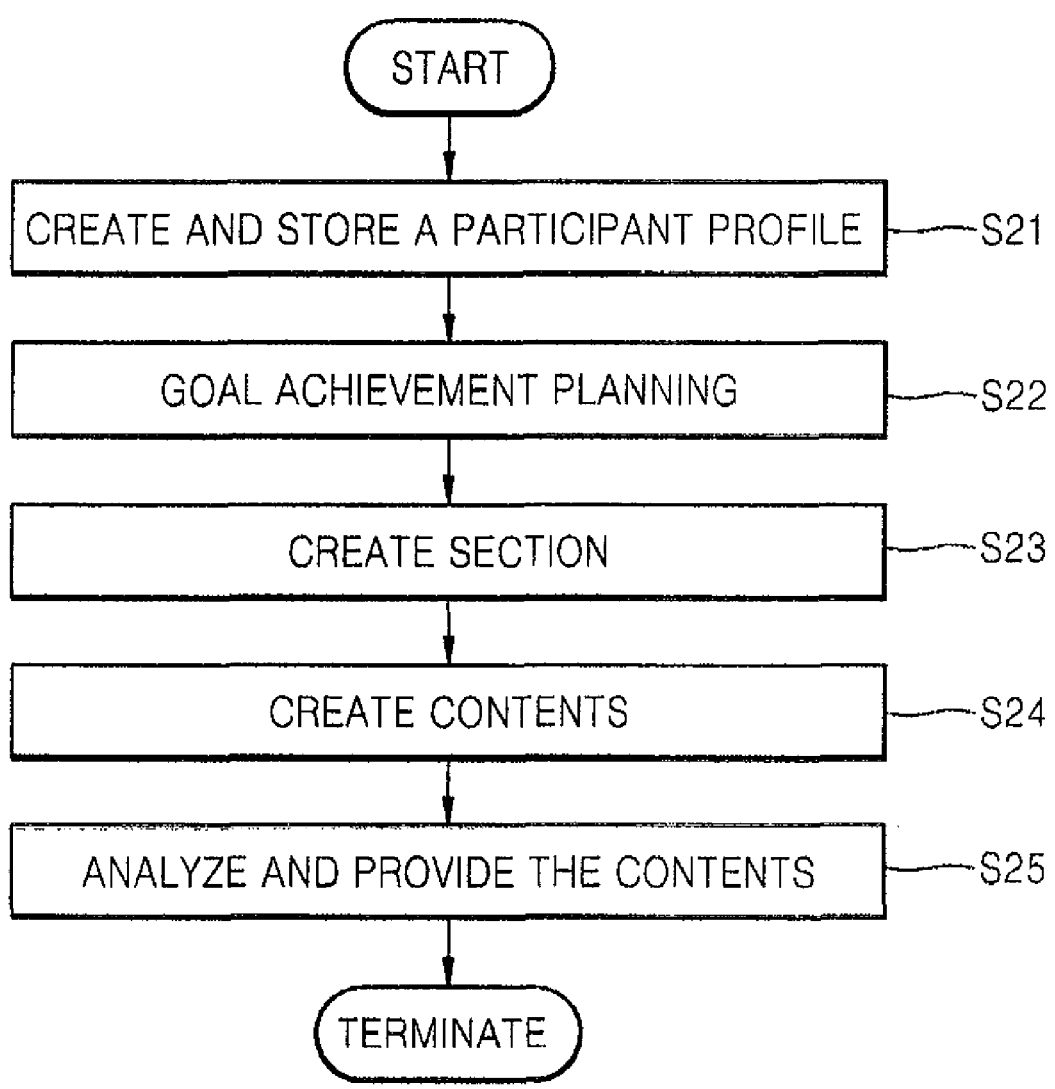

FIG. 11
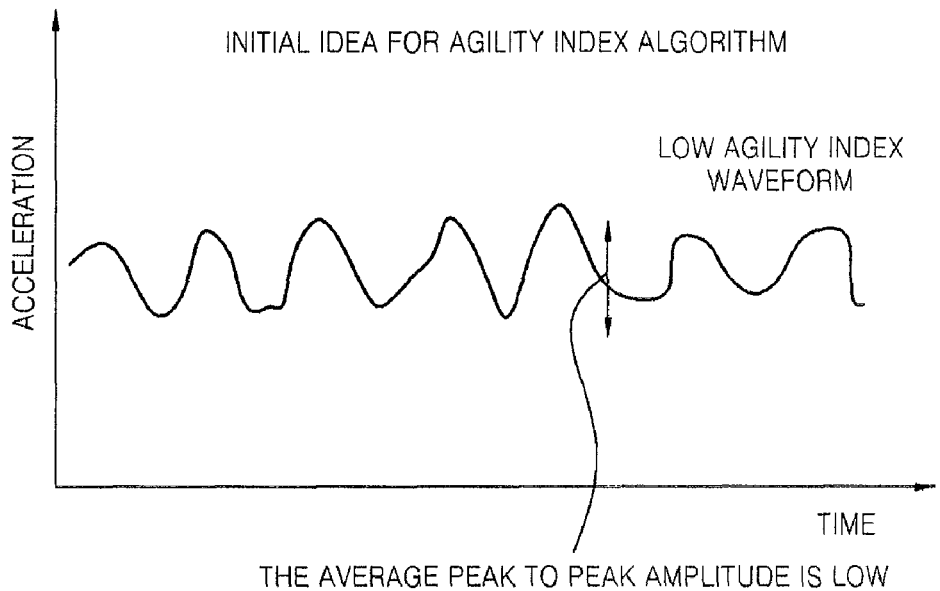
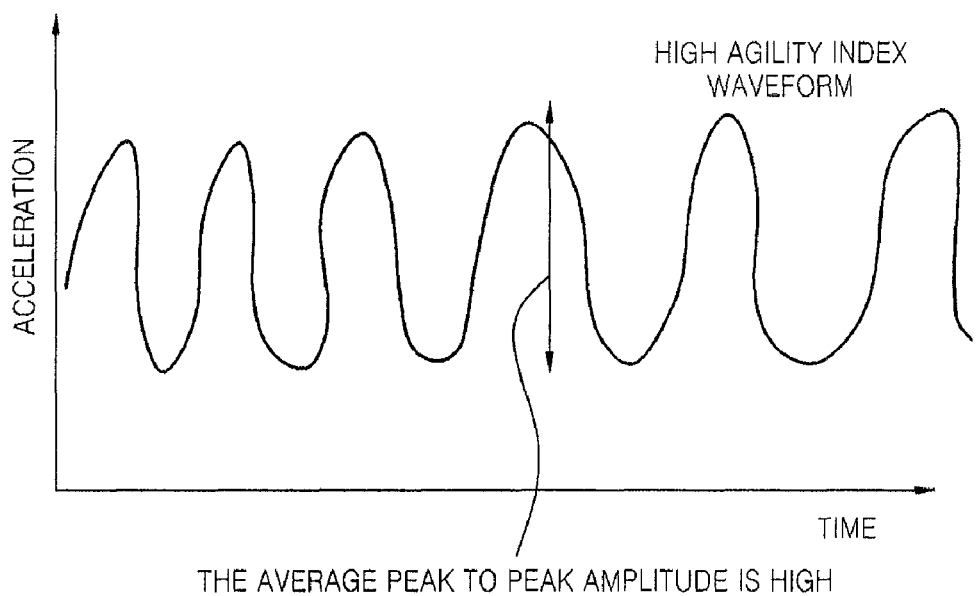

FIG. 12
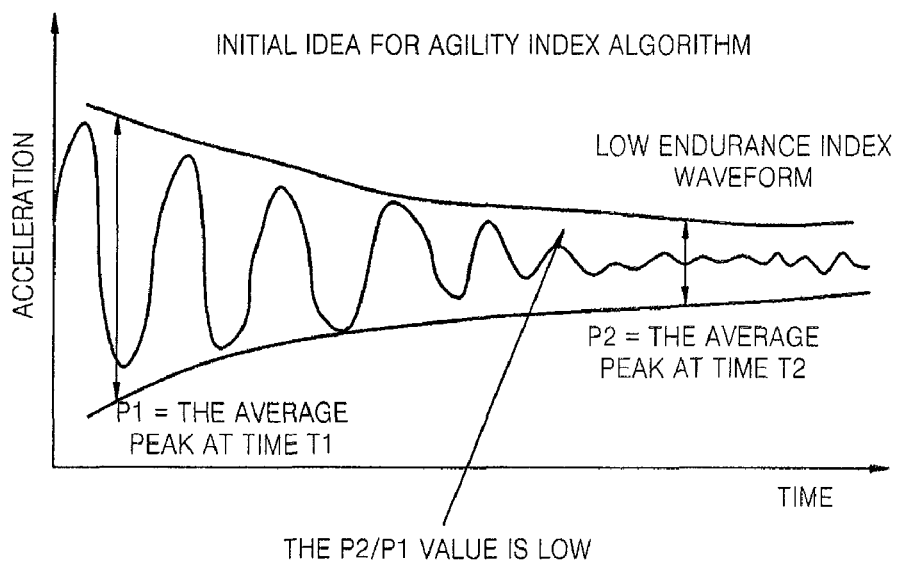
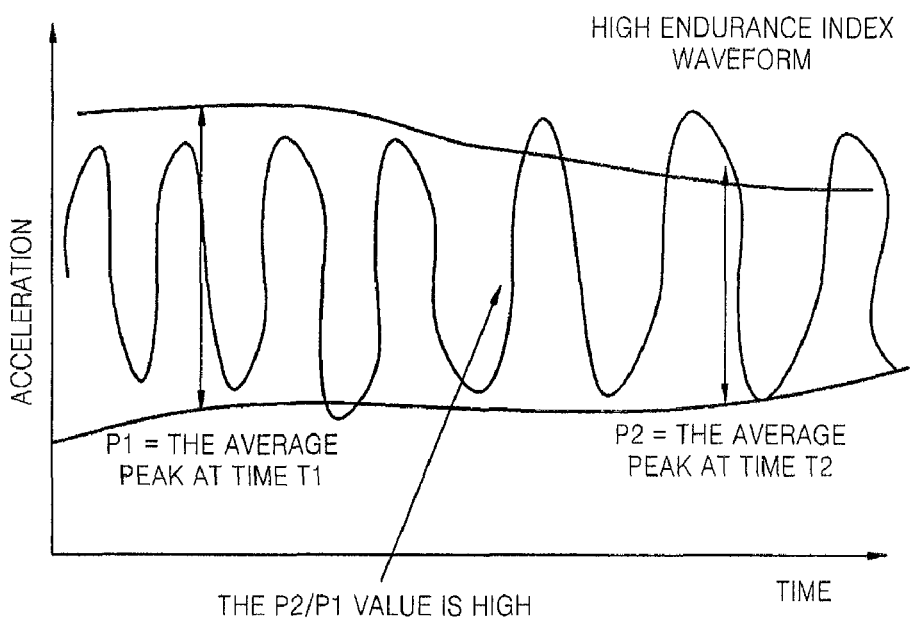

FIG. 13
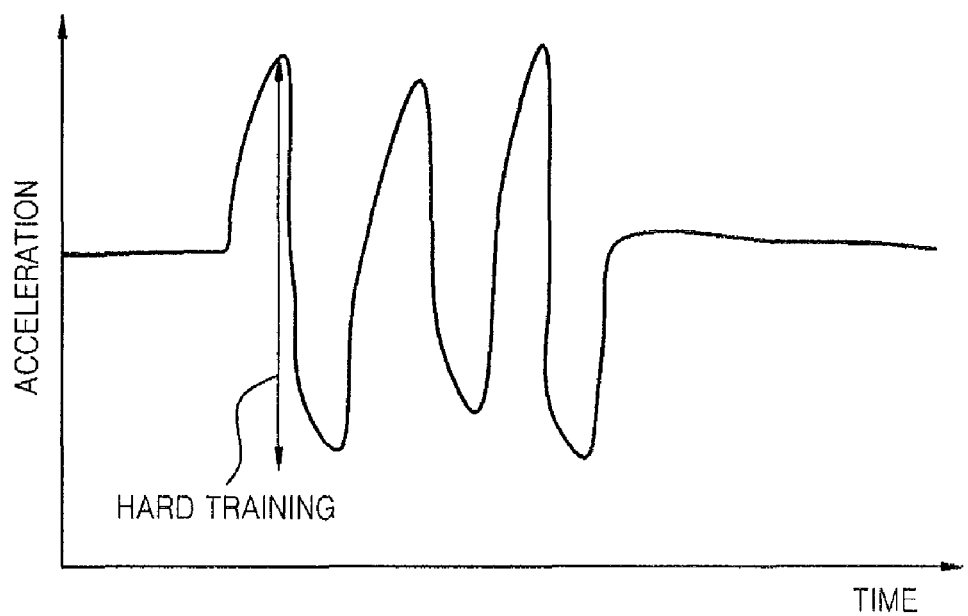
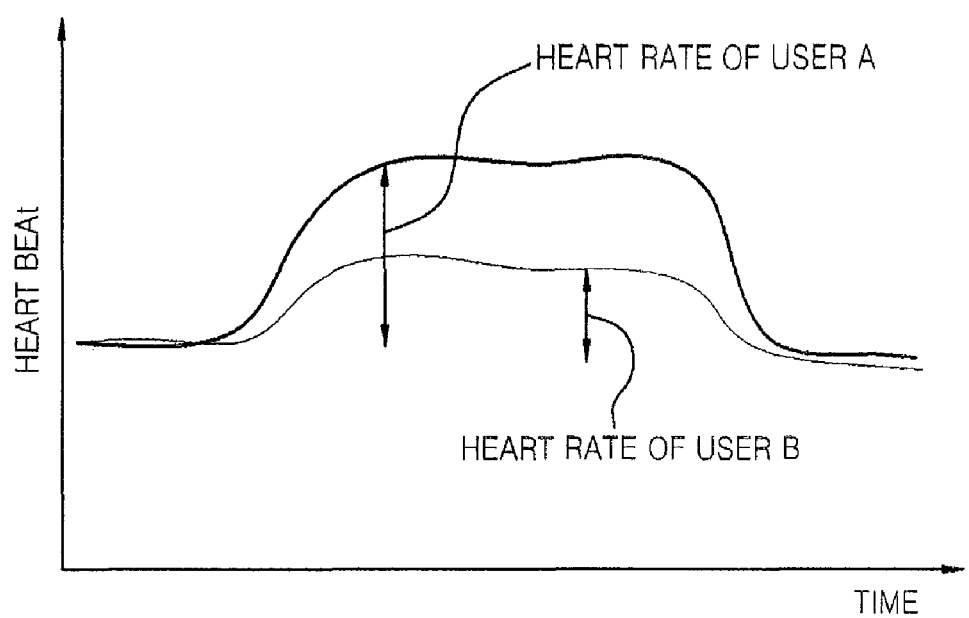

SYSTEM FOR MANAGING PHYSICAL TRAINING AND METHOD THEREOF

TECHNICAL FIELD

The present invention relates to a method and system for managing physical training, and more particularly, to a method and system for managing physical training, by which training effects can be objectified by quantitatively evaluating the physical training. The present invention also relates to an exercise program management field.

BACKGROUND ART

Conventionally, physical training is scheduled and executed by coaches or trainers. Therefore, it is difficult to quantitatively evaluate the training effects of the physical training, so that the physical training cannot be efficiently performed for each person. For example, an endurance-training program, in which a load movement should be appropriately controlled, has been established on the basis of subjective determination of coaches or trainers. Therefore, the endurance improvement effects cannot be objectively measured, and thus, the endurance of an athlete cannot significantly improve.

In addition, a maximal oxygen intake value is also used to measure the improvement of endurance. However, the maximal oxygen intake fails to accurately reflect the endurance of the athlete even during a game, during which the athlete should repeatedly run and stop to reach the maximal oxygen intake and then be able to recover to a normal state within a short time period.

Furthermore, even though agility training is important due to the fact that agility training may affect the result of a game involving the athlete, the agility of the athlete is inevitably measured using an indirect method such as a side-step method. For example, a soccer game is a representative fast sport that requires each athlete to bring his or her agility into action during an entire game and perform various types of motions. In such fast sports, coaches or trainers subjectively determine the agility of an athlete. Therefore, it is difficult to accurately measure the results of agility training.

As described above, conventional physical training has been performed on the basis of subjective determination of trainers or coaches. As result, it is impossible to quantitatively evaluate and objectively perform physical training that is customized to each athlete. As sports science continues to develop, there is a need for a method of managing physical training in order for physical training to be quantitatively evaluated and be objectively performed.

DETAILED DESCRIPTION OF THE INVENTION

Technical Problem

The present invention is able to solve the problems of conventional physical training and meet the aforementioned needs, and provides a method and system for managing physical training, by which an objective index of the effects of a physical training can be provided by quantitatively evaluating the physical training in order to allow the effects of a physical training to be customized to each training participant.

Technical Solution

According to a technical solution for obtaining the technical objective of the present invention, a training goal and a time schedule of a training participant is established on the basis of a profile reflecting physical characteristics of the participant, and training items are separately created on a section basis according to a predetermined standard with reference to the training goal and the time schedule. Movement of loads is set to each separately created section according to the training goal and the time schedule. Then, the contents required to manage a physical training of the training participant are created on the basis of the physical amounts that have been previously established and the various physical amounts measured by sensors attached to the training participant in real-time.

Advantageous Effects

According to the present invention, physical training can be quantitatively measured and objectively performed by a plan tool of a trainer, monitoring a training course, analyzing the result of the training, monitoring the motions of athletes during a game, adjusting a movement load, and the like. As a result, it is possible to improve the effects of training and safety.

In addition, it is possible to adjust a training load and a rest time by evaluating heat stress, and it is possible to protect a training participant from danger from an abrupt heat shock. Also, it is possible to accurately evaluate the effects of training by scientifically obtaining a calorie consumption, which is conventionally estimated using a pedometer or an accelerometer or on the basis of a heart rate of the training participant.

DESCRIPTION OF THE DRAWINGS

The above and other features and advantages of the present invention will become more apparent by describing in detail exemplary embodiments thereof with reference to the attached drawings in which:

FIG. 2 is a flowchart illustrating a method of managing physical training, according to an embodiment of the present invention;

FIG. 11 is graphs illustrating waveforms of acceleration data according to agilities of athletes, according to an embodiment of the present invention;

FIG. 12 is graphs illustrating a method of performing an endurance assessment during training of athletes, according to an embodiment of the present invention; and FIG. 13 is graphs illustrating variations of heart rates of athletes at a predetermined movement load, according to an embodiment of the present invention.

BEST MODE

Figure 1A:
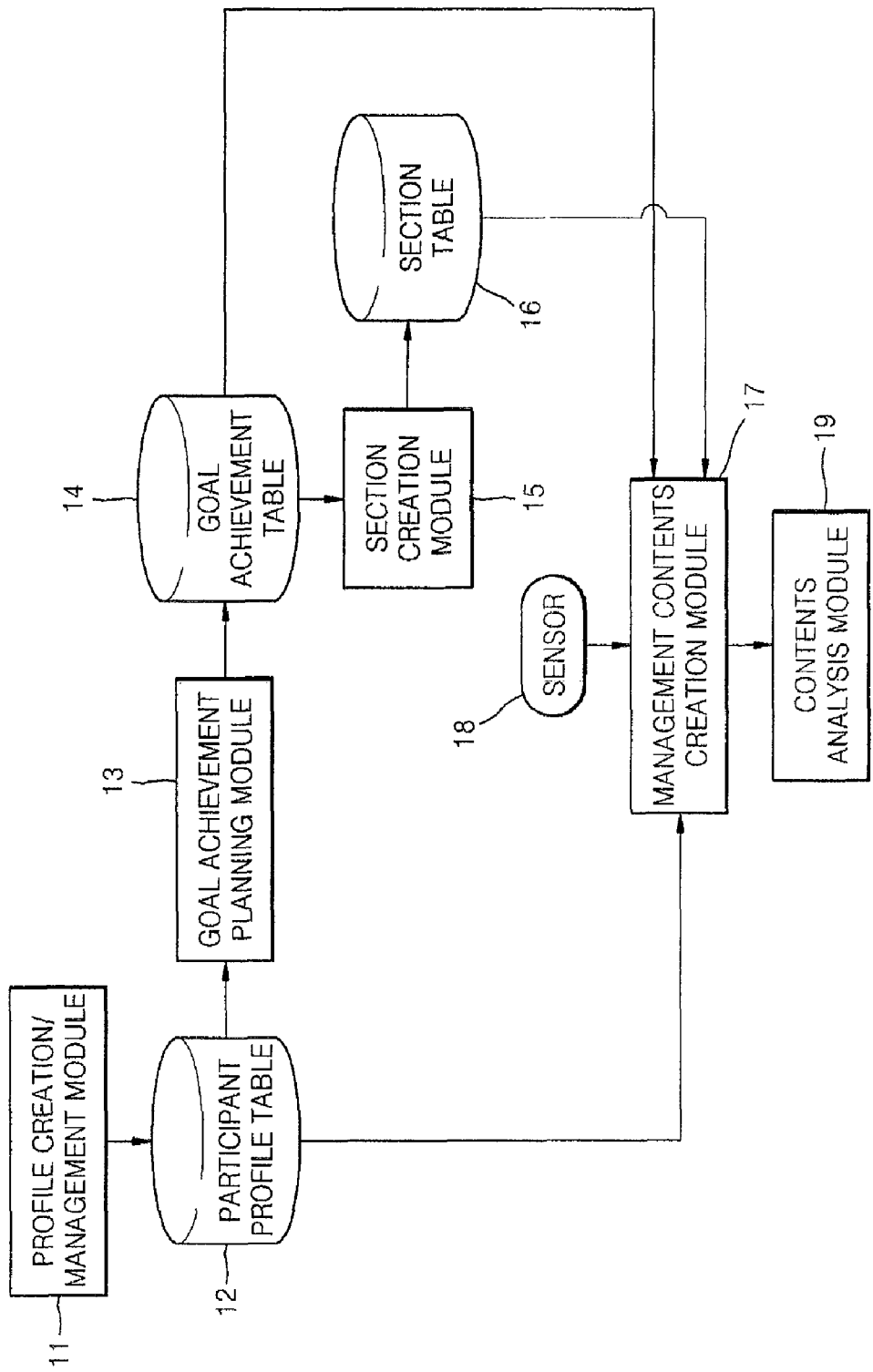
FIG. 1A is a block diagram illustrating a system for managing physical training, according to an embodiment of the present invention.

In order to embody the technical concept of the present invention and achieve the above-described objective and the technical needs, a system is provided for managing physical training, comprising: a goal achievement planning module establishing a training goal and a time schedule for a physical training participant on the basis of a profile reflecting physical characteristics of the physical training participant; a section creation module separately creating training items on a section basis according to the training goal and the time schedule for the physical training participant with reference to a predetermined standard; and a management contents creation module creating contents required to manage the physical training of the physical training participant on the basis of physical measurements previously established by the goal achievement planning module and the section creation module and various physical measurements measured from a plurality of sensors attached to the physical training participant in real-time.

Also, there is provided a method of managing physical training, comprising: establishing a training goal and a time schedule for a physical training participant on the basis of a profile containing information on physical characteristics of the physical training participant; separately creating training items on a section basis with reference to a predetermined standard according to the training goal and the time schedule for the physical training participant and setting a movement load for each section on the basis of the training goal and the time schedule for the physical training participant; and creating contents required to manage the physical training of the physical training participant on the basis of physical measurements established by the establishing of the training goal and the time schedule for the physical training participant and the separate creating of the training items and various physical measurements measured from sensors attached to the physical training participant in real-time.

MODE OF THE INVENTION

Hereinafter, the present invention will be described in detail with reference to the accompanying drawings to show the technical idea of the present invention. Throughout the drawings, like reference numerals denote like elements, and thus, elements in other drawings can be referred to as being necessary for a description of the other drawings.

Figure 1B:
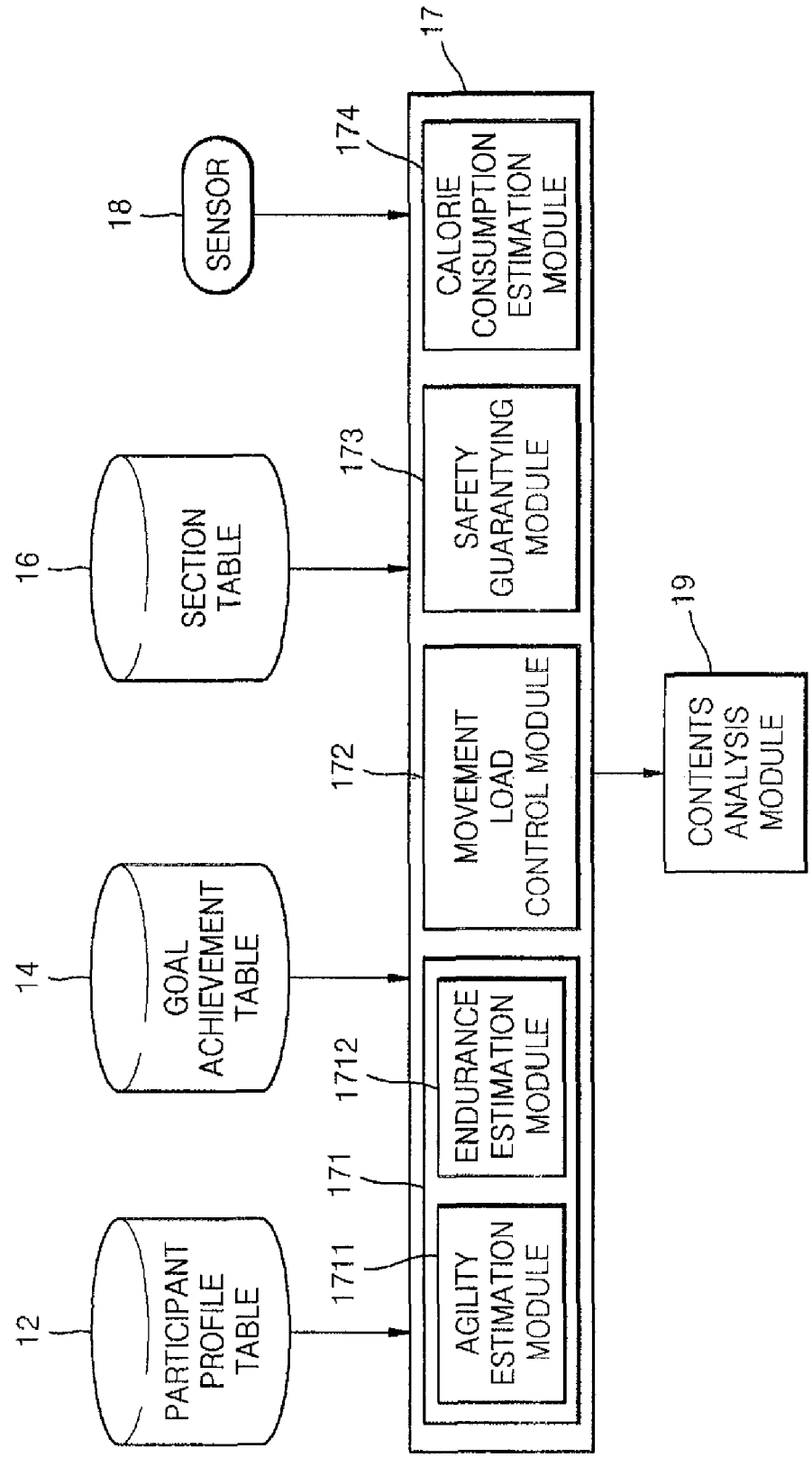
FIG. 1B is a block diagram illustrating a system that is optimally implemented, according to an embodiment of the present invention.

FIG. 1A is a block diagram illustrating a system for managing physical training, according to an embodiment of the present invention, and FIG. 1B is a block diagram illustrating a system that is optimally implemented, according to an embodiment of the present invention.

In order to manage physical training according to an embodiment of the present invention, a profile of a training participant (athlete) is created and stored using a participant profile creation/management module 11, and a training goal and a time schedule for the training participant are established using a target planning module 13. Then, a section creation module 15 creates a training section on the basis of the training goal and the time schedule for the training participant, and a management contents creation module 17 creates contents on the basis of the created training section and various kinds of data sensed by sensors. Subsequently, analyzing the created contents of the management contents creation module 17 provides information on the results of the physical training.

A trainer creates the profile of the training participant using the participant profile creation/management module 11 and stores the profile in a participant profile table 12 (S21). The participant profile table 12 includes a participant master table, which receives and stores personal data of the training participant such as a name, gender, a birth date, and a portrait photograph, and a participant condition table, which receives and stores data directly required to manage the training of each training participant, such as weight, height, a maximal heart rate, a maximal oxygen intake, a body fat percentage, speed, and endurance, which may be obtained from historical data or through a periodic medical checkup.

The creation and storing of the participant profile is implemented by inputting the personal data and the data directly required to manage the training of each participant to the participant master table and the participant condition table through the participant profile creation/management module 11. The participant profile creation/management module 11 is implemented such that the data can be modified or deleted in real-time by a coach or a trainer, and this principle is similarly applied to various modules as described below.

Then, a goal achievement planning procedure is performed. Specifically, the trainer selects a training participant from the participant profile table 12 using a goal achievement planning module 13, establishes a training goal and a time schedule for the selected participant, and stores the training goal and the time schedule for the selected participant in a goal achievement table 14 (S22). The goal achievement table 14 includes a goal achievement master table, which stores data on season training, such as the training goal and the training time schedule, and a goal achievement member table, which stores a participant list and data on goals of each participant. The goals designated for each participant may include improvement of endurance or agility, weight control, or the like.

Subsequently, a section creation procedure is performed. A section creation module 15 separately creates training items such as an achievement level and a training load for each participant on a section basis according to the goal and the time schedule of the participant with reference to data of the goal achievement table 14. Also, the section creation module 15 sets a movement of load for each section based on the established goal and the time schedule, and automatically daily stores the movement of load in a section table 16 (S23). In this case, the section creation module 15 may separately create other training items on a section basis, which may depend on a selection of the trainer.

The trainer adjusts the content of the section table 16, and the training participant begins to exercise according to the movement of load and the time schedule designated in the section table 16.

A management contents creation module 17 creates contents required to manage the training during the training of the training participant (S24). A plurality of sensors 18 are attached to the body of the participant to measure physical measurements such as a heart rate, acceleration, humidity, and temperature in real-time during the training of the training participant. The management contents creation module 17 creates the following contents based on the physical measurement values from the sensors 18 and the data stored in the aforementioned tables 12, 14, and 16 for each participant.

1. Movement Assessment

A movement assessment is performed by a movement assessment module 171 of the management contents creation module 17. The movement assessment of the present invention includes an agility assessment and an endurance assessment. For the movement assessment, data such as a heart rate, acceleration, and ambient humidity and temperature are obtained from the sensors 18 that are attached to the body of the training participant, and the personal data such as weight, gender, and age are obtained from the participant profile table 12, so that the personal data can be reflected to the movement assessment.

a) Agility Assessment

An agility assessment is performed by an agility assessment module 1711 of the movement assessment module 171. A statistical analysis of acceleration data is used to assess the agility of the training participant. Conventionally, the movement of a participant having a high agility is characterized in that an amplitude variation of a statistical waveform of acceleration data according to time is larger than that of a participant having a lower agility. Therefore, the agility can be quantitatively evaluated by using a method of obtaining a standard deviation of time series data on the acceleration for a predetermined time window. In this case, the agility of a participant having a higher weight may be assessed higher within the same standard deviation in comparison with a participant having a lower weight. The agility assessment value is called a weight correction agility value. Similarly, a gender correction agility value or an age correction agility value may be further calculated by applying gender or age.

b) Endurance Assessment

An endurance assessment is performed by an endurance assessment module 1712 of the movement assessment module 17. Conventionally, a training participant having a higher endurance is characterized in that variation of activity according to time is not greater than that of a training participant having a lower endurance (for example, an acceleration signal may be used as an index of the activity). Accordingly, the endurance assessment of the participant can be performed by using a ratio between an agility value P1 at a training start point and an agility value P2 after a predetermined time period.

As a second method, the endurance of the participant may be assessed by using a ratio between a heart rate at a training start point and a heart rate after a predetermined time period, supposing that the training participants exercise to the same quantity of motion. In this case, it can be said that a participant has a higher endurance as the ratio decreases. Therefore, the endurance assessment can be performed by comparing the heart rates of training participants who exercise to the same quantity of motion that is revealed from the acceleration signal.

2. Movement Load Adjustment a) A movement load adjustment is performed by a movement load adjustment module 172 of the management contents creation module 17. The movement load adjustment is indispensable in order to establish the movement load to be optimized to a physical condition and various data of the training participant. This procedure is performed as follows. As described above, the movement load (i.e., the quantity of motion) is established by the section creation module 15 on the basis of the training goal and the time schedule established by the goal achievement planning module 13. Accordingly, the established movement load can be converted into a target heart rate on the basis of a maximal heart rate of each participant. The establishment of the movement load is performed in three procedures on the basis of the target heart rate and the training time as described below.

i) Preparation Period: Increment from a stable heart rate to a target heart rate gradually.

ii) Exercise Period: Exercise at the target heart rate for a predetermined time interval.

iii) Recovery Period: Decrement from the target heart rate to the stable heart rate gradually.

b) When an appropriate movement load is established for the training time, the movement load is regularly adjusted during an actual training. If the heart rate measured from the sensor 18 does not reach the target heart rate, it is determined that the movement load is not sufficient. Accordingly, a warning sound may be provided to increase the movement load. On the contrary, if the measured heart rate is higher than the target heart rate, it is determined that the movement load is too high. Accordingly, a warning sound may be provided to decrease the movement load. In addition, the measured heart rate may be transmitted to terminals of the coaches or trainers using a wireless monitoring function to allow the coaches or trainers to determine the movement load of the participant, thereby providing an efficient training.

3. Safety

The physical safety of the participant should be also guaranteed during the training. The two main factors governing the physical safety are temperature and humidity. A safety module 173 of the management contents creation module 17 estimates a Wet Bulb Global Temperature (WBGT) index from personal data such as weight, gender, and age included in the personal profile table 12 and humidity and temperature obtained from the sensors 18 during the training to guarantee safety of the training of the participant.

The estimation of the WBGT index is performed on the basis of whether or not the WBGT index meets the International Standardization Organization (ISO) standard. The safety module 173 assesses heat stress and a heat load of the participant on the basis of the estimated WBGT index, and establishes a standard of the physical safety required to perform the training on the basis of the assessment, so that the training can be performed according to the standard of the physical safety required to perform the training.

4. Calorie Consumption

A calorie consumption measurement module 174 of the management contents creation module 17 assesses the metabolic amount of the training participant on the basis of the temperature and humidity input from the sensors 18, personal data such as weight, gender, and age obtained from the personal profile table 12, and the like. Then, the calories consumed during the training are measured on the basis of the metabolic amount of the training participant.

a) Weight control through a diet is one of the important goals of the physical training. For this purpose, the calorie consumption during the training may be measured, and information on the diet may be provided according to the measured calorie consumption.

b) The calorie consumption is measured by calculating a calorie consumption per minute on the basis of information such as the heart rate, gender, and weight and integrating the calorie consumption per minute with respect to the time series data of an average heart rate per minute. The calorie consumption per minute can be obtained as follows.

i) Regression Modeling Using a Stepwise Method

According to the stepwise method, the heart rate, an interaction between weight and the heart rate, and an interaction among weight, gender, and the heart rate are relatively effective to determine an energy consumption. However, only the gender or weight does not significantly affect the energy consumption.

<Regression Equation Using Stepwise Method>

$$\text{Energy Consumption (cal/min)} = 100.127 + S^*(-8577.731) + W^*(-106.729) + H^*12.580 + (S^*W)^*113.209 + (W^*H)^*38.847 + (S^*B)^*1.251 + (S^*H^*W)^*(-0.23),$$

where, S denotes gender, W denotes weight, H denotes height, and B denotes a heart rate. The value of S may be set to 1 for a man and 0 for a woman. The unit of B is beat/min, and the unit of W is kg.

The regression equation using the stepwise method has a coefficient of determination of 0.852, which shows that the proposed regression equation appropriately models the energy consumption.

ii) Regression Modeling Using Heart Rate, Gender, and Weight

In the regression modeling using the heart rate, gender, and weight, only the heart rate, the gender, and the weight are selected as a descriptive variable with interactions of all other variants no considered in order to provide a regression model.

<Regression Equation Using Heart Rate, Gender, and Weight>

$$\text{Energy Consumption (cal/min)} = -15289.276 + S^*117.083 + W^*102.905 + H^*1883.398,$$

where, S, W, and H denotes gender, weight, and height, respectively.

Similarly, the regression equation using the heart rate, gender, and weight has a coefficient of determination of 0.824, which shows that the proposed regression equation appropriately models the energy consumption.

c) Alternatively, a relationship between the heart rate and the calorie consumption is previously measured for each participant, and then, the calorie consumption may be estimated on the basis of the relationship. This allows the calorie consumption to be more accurately estimated.

The contents created through the aforementioned methods are stored in an assessment result database. A user may monitor a goal of the season and a current achievement state through a graphical representation by pressing a button of the training management software. As a result, the trainer may determine whether the current training plan is appropriate or should be reinforced, so that the training can be more scientifically performed.

A contents analysis module 19 analyzes the aforementioned various contents created by the management contents creation module 17 to find out a training management plan appropriate to the participant and provides the training management plan to the trainer (S25).

Figure 3:
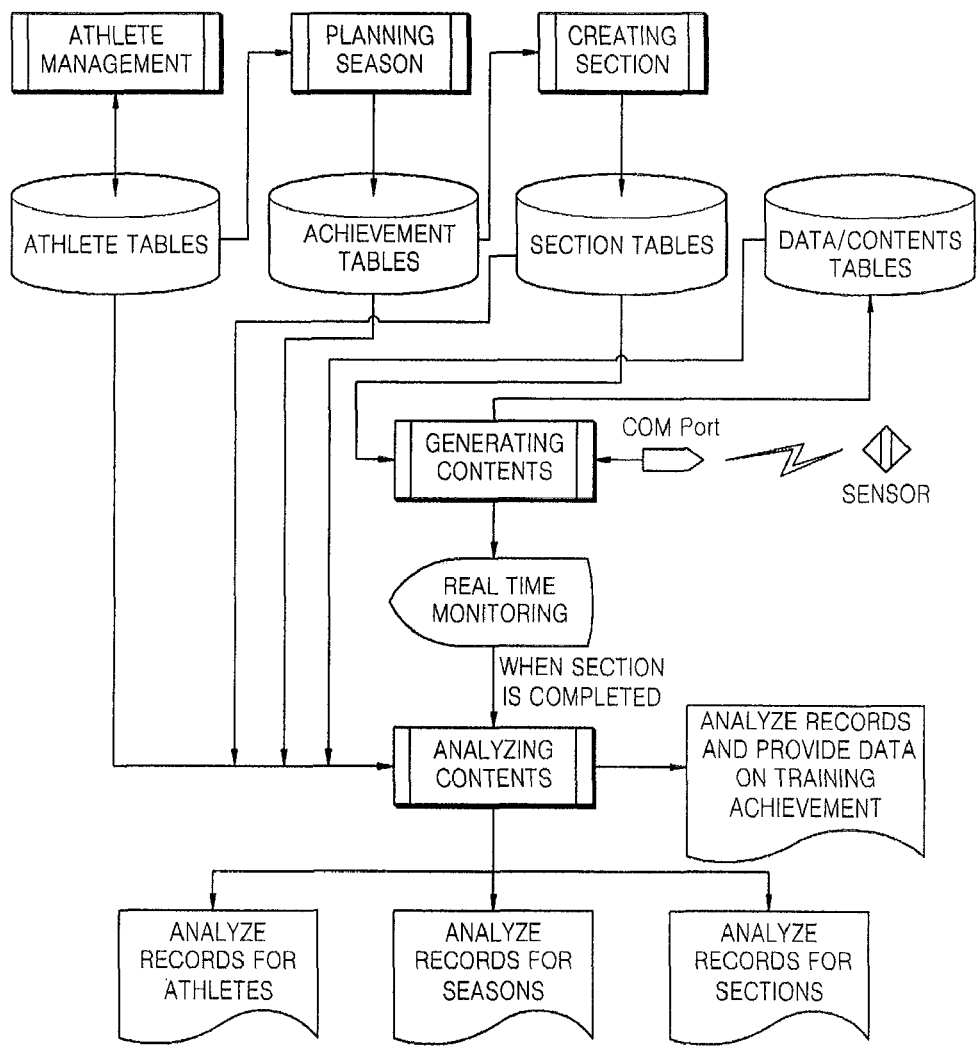
FIG. 3 is a diagram illustrating general operations of a system for managing physical training, according to an embodiment of the present invention.

FIG. 3 is a diagram illustrating general operations of a system for managing physical training, according to an embodiment of the present invention.

Referring to FIG. 3, a trainer executes an athlete management module and stores a profile of an athlete in athlete tables.

The athlete tables include an athlete master table and an athlete status table. The athlete master table stores basic data of the athlete, such as a name, gender, a birth date, a portrait photograph, and a competitive sport, and the athlete status table stores periodically updated data, such as weight, height, a maximal heart rate, a maximal oxygen intake, a body fat percentage, speed, and endurance.

Figure 4:
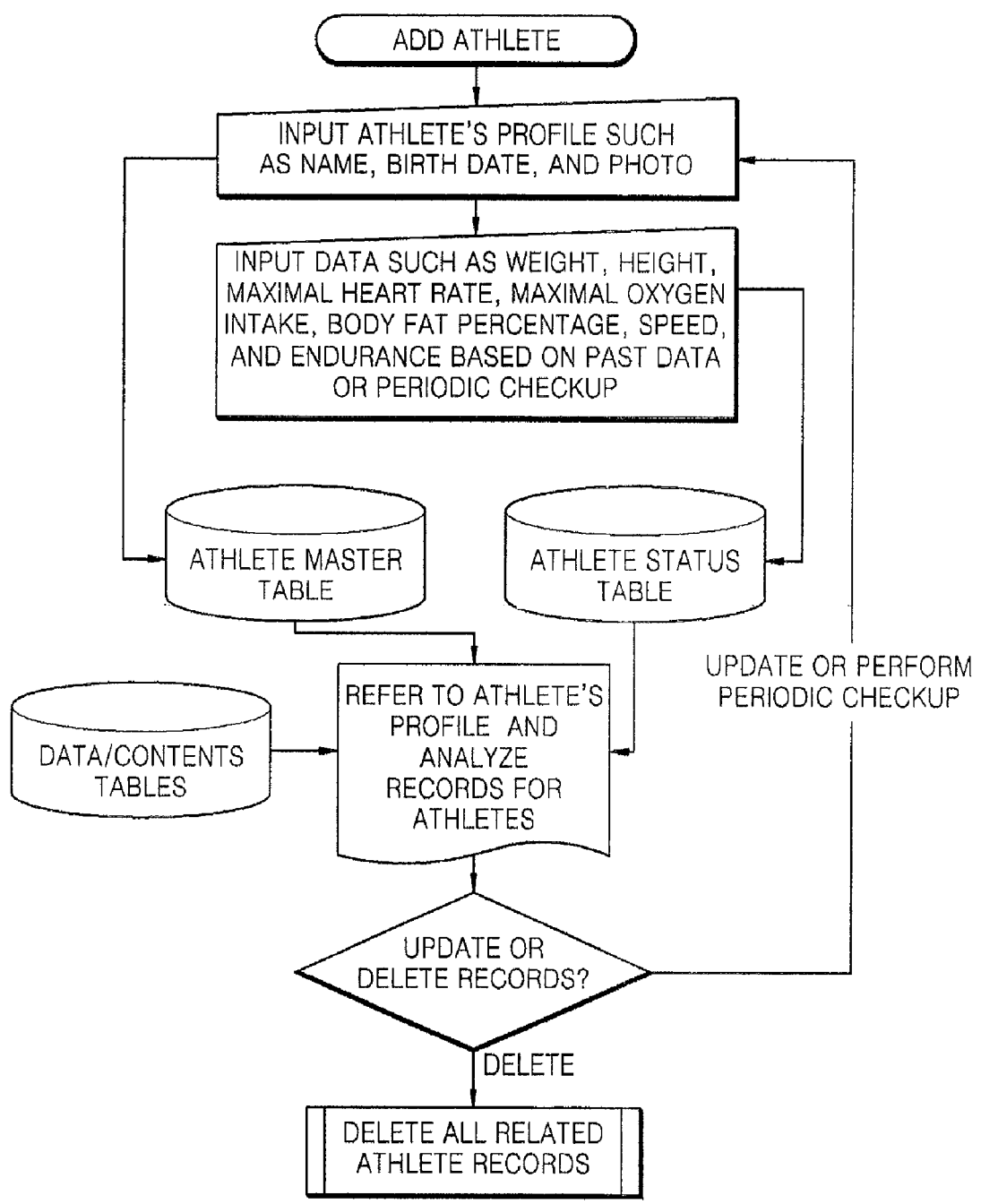
FIG. 4 is a diagram illustrating a method of storing a profile of an athlete in athlete tables illustrated in FIG. 3, according to an embodiment of the present invention.

A method of storing the profile of the athlete in the athlete tables is illustrated in FIG. 4.

Then, a planning season module selects athletes to participate season training from the athlete tables, determines a training goal and training time of each of the selected athletes, and stores the training goal and the training time in achievement tables.

The achievement tables include an achievement master table and an achievement member table. The achievement master table stores data on the season training, such as the training goal and the training time, and the achievement member table stores a list of the athletes to participate the season training and data on goals of each athlete.

Figure 5:
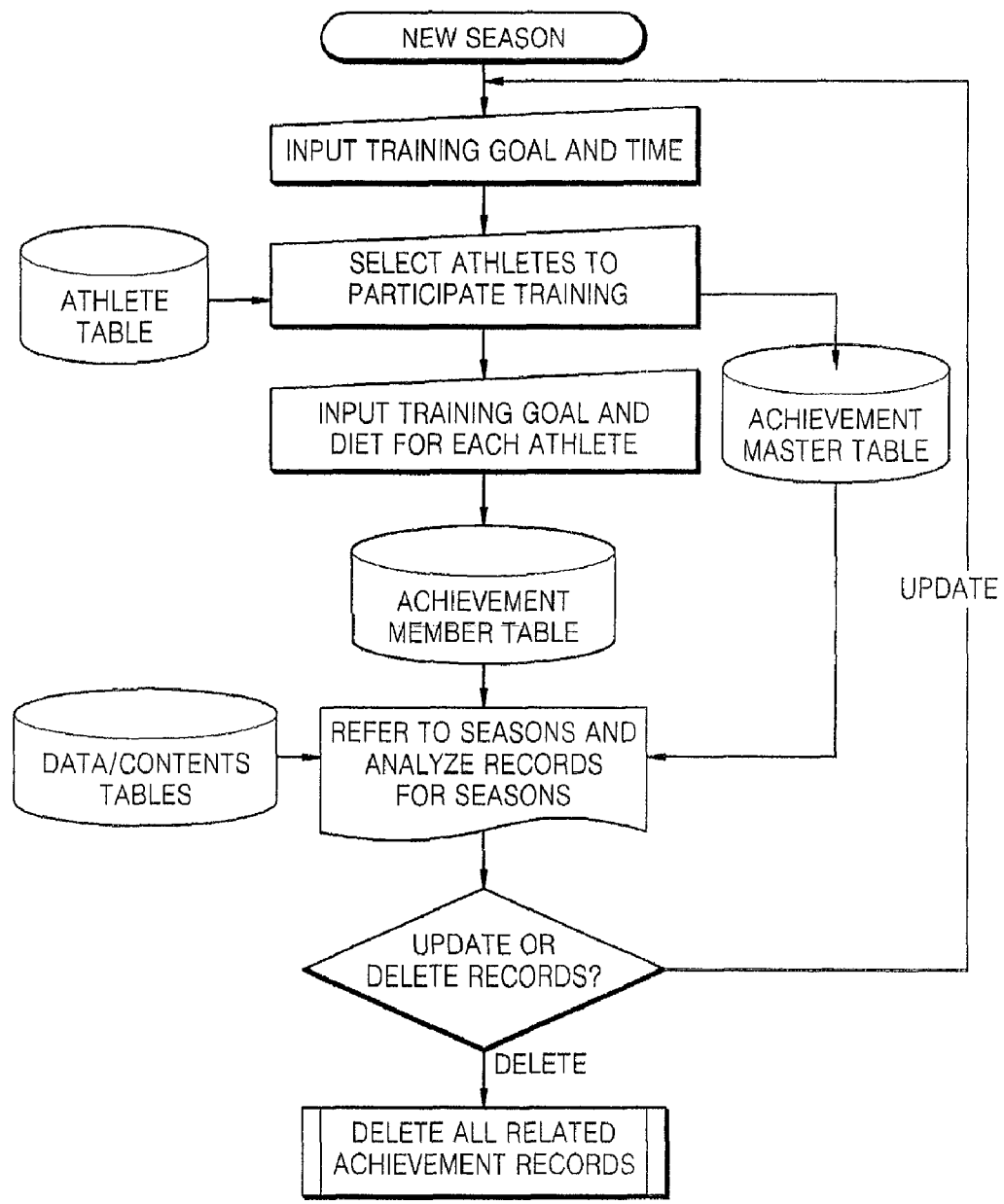
FIG. 5 is a diagram illustrating a method of storing a training goal and training time in achievement tables illustrated in FIG. 3, according to an embodiment of the present invention.

A method of storing the training goal and the training time in the achievement tables is illustrated in FIG. 5.

The goals designated for each athlete may include improvement of endurance or agility, weight control, or the like. The planning season module generates section tables which automatically store information on a daily training load according to the training goal and the training time.

The section tables include a section master table. The section maser table stores data on daily training records such as the training goals and an achievement level of each athlete.

Figure 6:
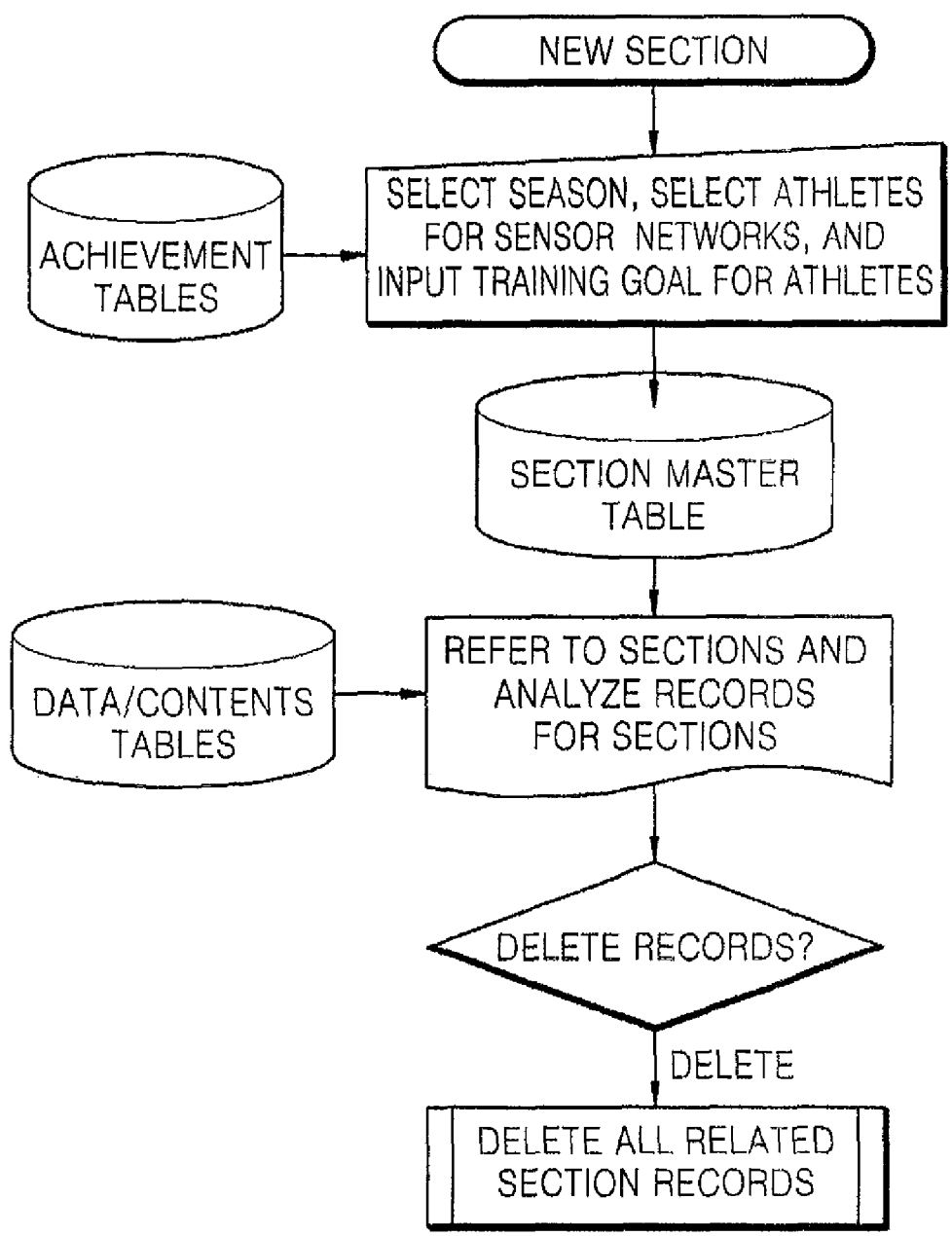
FIG. 6 is a diagram illustrating a method of storing daily training records in section tables illustrated in FIG. 3, according to an embodiment of the present invention.

A method of storing the daily training records in the section tables is illustrated in FIG. 6.

A section is started by the trainer by modifying contents of the section tables and athletes are trained according to the training load and the training time designated by the section tables.

Figure 7:
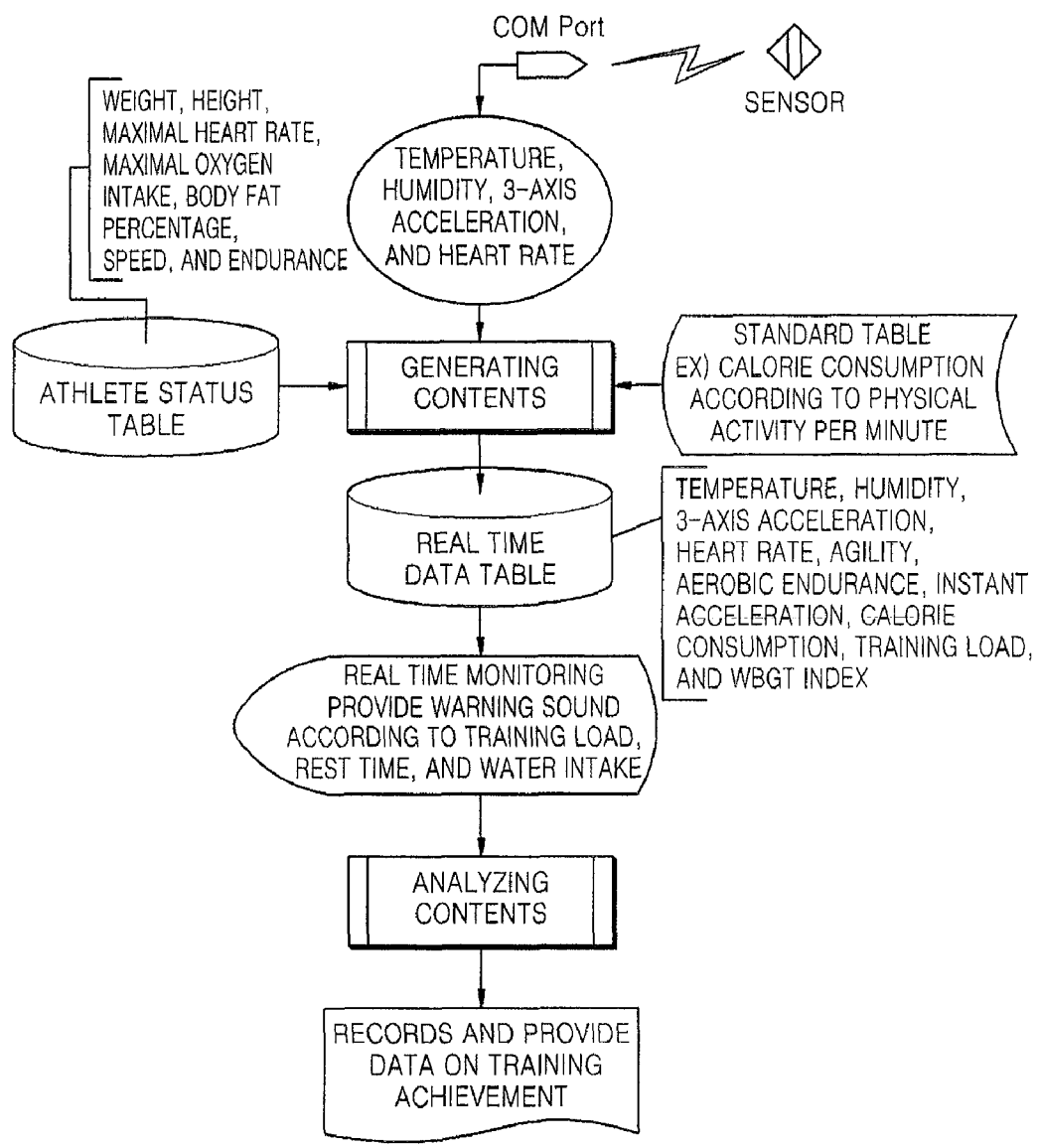
FIG. 7 is a diagram illustrating a method of creating contents during training of athletes, according to an embodiment of the present invention.

Data/contents tables are created during the training, according to a flowchart illustrated in FIG. 7. A plurality of sensors are attached to the body of the athlete in order to measure physical measurements such as a heart rate, acceleration, humidity, and temperature and the data/contents tables are created according to the measurements of the sensors and the data of the athlete as described below.

Basically, the data/contents tables include a real time data table. The real time data table stores and manages agility, aerobic endurance, instant acceleration, calorie consumption, a training load, or the like by using data of the athlete status table and data such as temperature, humidity, 3-axis acceleration, and a heart rate, which is input from the sensors.

1. Calorie Consumption Estimation

Figure 8:
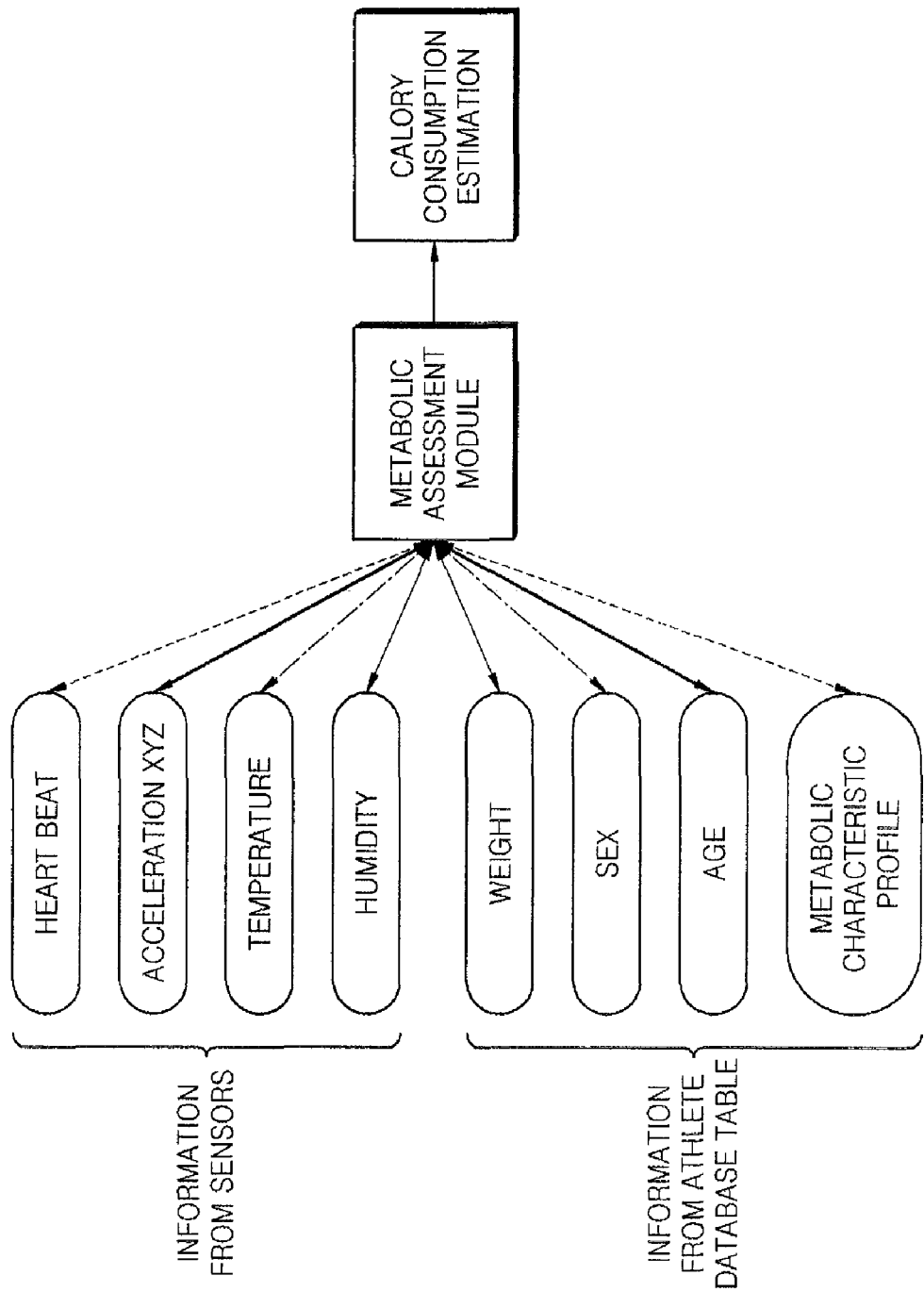
FIG. 8 is a diagram illustrating a method of performing a calorie consumption estimation during training of athletes, according to an embodiment of the present invention.

Since most athletes take diet, weight control is one of many goals of physical training as illustrated in FIG. 8. For this purpose, calorie consumption during the training may be estimated, and information on the diet may be provided according to the estimated calorie consumption.

The calorie consumption is measured by calculating a calorie consumption per minute on the basis of information such as a heart rate, gender, and weight and integrating the calorie consumption per minute with respect to the time series data of an average heart rate per minute. The calorie consumption per minute can be obtained as follows.

i) Regression Modeling Using a Stepwise Method

According to the stepwise method, the heart rate, an interaction between weight and the heart rate, and an interaction among weight, gender, and the heart rate are relatively effective to determine an energy consumption. However, only the gender or weight does not significantly affect the energy consumption.

<Regression Equation Using Stepwise Method>

$$\text{Energy Consumption (cal/min)} = 100.127 + S*(-8577.731) + W*(-106.729) + H*12.580 + (S*W)*113.209 + (W*H)*38.847 + (S*B)*1.251 + (S*H*W)*(-0.23),$$

where, S, W, and H denotes gender, weight, and height, respectively. (S: Man-1, Woman-0, B: beat/min, W: kg)

The regression equation using the stepwise method has a coefficient of determination of 0.852, which shows that the proposed regression equation appropriately models the energy consumption.

ii) Regression Modeling Using Heart Rate, Gender, and Weight

In the regression modeling using the heart rate, gender, and weight, only the heart rate, the gender, and the weight are selected as a descriptive variable with interactions of all other variants no considered in order to provide a regression model.

<Regression Equation Using Heart Rate, Gender, and Weight>

$$\text{Energy Consumption (cal/min)} = -15289.276 + S*117.083 + W*102.905 + H*1883.398,$$

where, S, W, and H denotes gender, weight, and height, respectively. (S: Man-1, Woman-0, B: beat/min, W: kg)

Similarly, the regression equation using the heart rate, gender, and weight has a coefficient of determination of 0.824, which shows that the proposed regression equation appropriately models the energy consumption.

Alternatively, a relationship between the heart rate and the calorie consumption is previously measured for each athlete, and then, the calorie consumption may be estimated on the basis of the relationship. This allows the calorie consumption to be more accurately estimated.

2. Safety Enhancement by Heat Stress Estimation

Figure 9:
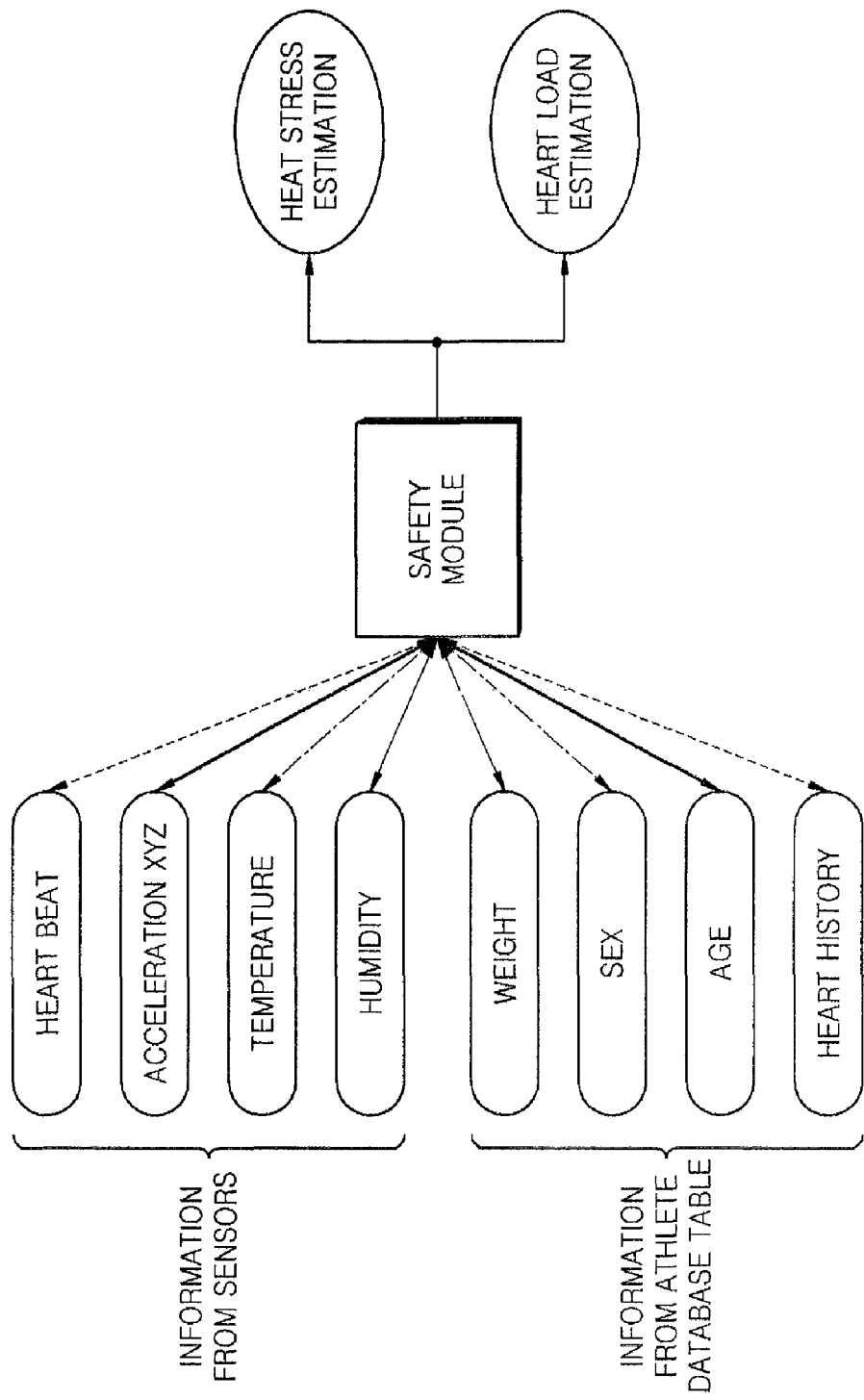
FIG. 9 is a diagram illustrating a method of performing a training load assessment for safety enhancement during training of athletes, according to an embodiment of the present invention.

A Wet Bulb Global Temperature (WBGT) index may be estimated during training on the basis of temperature and humidity, as illustrated in FIG. 9. A training load may be assessed on the basis of a heart rate.

Accordingly, athletes may be trained on the basis of a standard of physical safety according to the International Standardization Organization (ISO) standard. A rest time and the training load may be adjusted according to the standard of physical safety, during the training.

3. Movement Assessment

Figure 10:
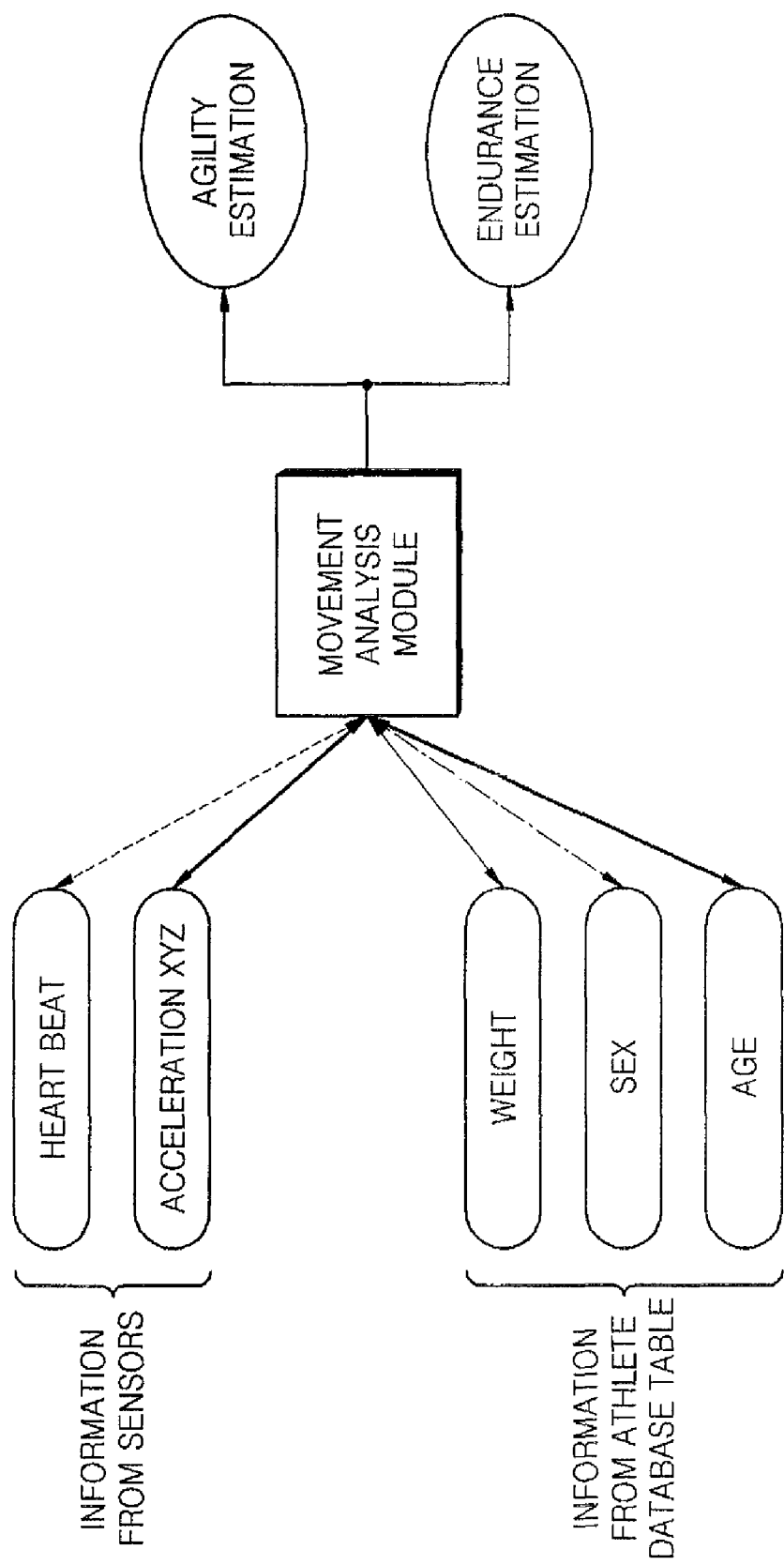
FIG. 10 is a diagram illustrating a method of performing a movement assessment during training of athletes, according to an embodiment of the present invention.

A movement assessment is performed by obtaining data on a heart rate and acceleration from the sensors, as described in FIG. 10. Also, personal data such as weight, gender, and age is obtained from a database so that the personal data can be reflected to the movement assessment.

Mainly, the movement assessment includes an agility assessment and an endurance assessment. A statistical analysis of acceleration data is used to perform the agility assessment.

As illustrated in FIG. 11, conventionally, the movement of an athlete having a high agility is characterized in that an amplitude variation of a statistical waveform of acceleration data is larger than that of another athlete having a lower agility. Therefore, the agility can be quantitatively evaluated by using a method of obtaining a standard deviation of time series data on the acceleration for a predetermined time window.

In this case, the agility of an athlete having a higher weight may be assessed higher within the same standard deviation in comparison with another athlete having a lower weight. The agility assessment value is called a weight correction agility value.

Similarly, a gender correction agility value or an age correction agility value may be further calculated by applying gender or age.

The endurance assessment is performed by using various methods.

As illustrated in FIG. 12, an athlete having a higher endurance is characterized in that variation of activity is not greater than that of another athlete having a lower endurance although the athlete is getting tired as time passes. Accordingly, the endurance assessment of the athlete can be performed by comparing an agility value at a training start point and an agility value after a predetermined time period.

In a second method, supposing that athletes exercise at the same movement load, if a heart rate of an athlete is relatively low than that of other athletes, the endurance of the athlete may be assessed to be higher than the other athletes. Therefore, as illustrated in FIG. 13, the endurance assessment can be performed by comparing the heart rates of athletes who exercise at a predetermined movement load that is revealed from an acceleration signal.

4. Movement Load Adjustment

In order to adjust a movement load, an appropriate movement load has to be established. The appropriate movement load is established as follows. If a training goal and training time of season training are established, the movement load or a movement quantity of an individual section is established according to the training goal and the training time.

Accordingly, the established movement load can be converted into a target heart rate on the basis of a maximal heart rate of each athlete. The establishment of the movement load is performed in three procedures on the basis of the target heart rate and the training time as described below.

i) Preparation Period: Increment from a stable heart rate to a target heart rate gradually.

ii) Exercise Period: Exercise at the target heart rate for a predetermined time interval.

iii) Recovery Period: Decrement from the target heart rate to the stable heart rate gradually.

When an appropriate movement load is established for the training time, the movement load is regularly adjusted during an actual training. If the heart rate measured from the sensors does not reach the target heart rate, it is determined that the movement load is not sufficient. Accordingly, a warning sound may be provided to increase the movement load.

On the contrary, if the measured heart rate is higher than the target heart rate, it is determined that the movement load is too high. Accordingly, a warning sound may be provided to decrease the movement load.

In addition, the measured heart rate may be transmitted to a monitoring terminal of a coach or a trainer using a wireless monitoring function to allow the coach or the trainer to determine the movement load of the athlete, thereby providing an efficient training.

The contents created through the aforementioned methods are stored in the database. A user may monitor a goal of the season training and a current achievement state through a graphical representation by pressing a button of training management software.

As a result, the trainer may determine whether a current training plan is appropriate or should be reinforced, so that the training can be more scientifically performed.

The present invention can also be embodied as computer readable codes on a computer readable recording medium. The computer readable recording medium is any data storage device that can store data, which can be thereafter read by a computer system.

Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by one skilled in the art that various changes in form and details may be made therein without departing from the spirit and scope of the present invention as defined by the appended claims.

The exemplary embodiments should be considered in a descriptive sense only and not for limited purposes. Therefore, the scope of the present invention is defined not by the detailed description of the present invention but by the appended claims, and all differences within the scope will be construed as being included in the present invention.

The invention claimed is:

1. A system for managing physical training, the system includes a computer program embodied on non-transitory computer-readable media to be executed by a processor, the computer-readable media comprising:
   a goal achievement planning module configured to establish a training goal and a time schedule for a physical training participant on the basis of a profile, the profile including physical characteristics of the physical training participant;
   a section creation module configured to create discrete training items on a section basis according to the training goal, the time schedule for the physical training participant, and an achievement level with reference to a predetermined standard, or on the basis of a determination of a trainer, and establish a movement load according to the training goal and the time schedule of the physical training participant; and
   a management contents creation module configured to create contents required to manage the physical training of the physical training participant on the basis of first physical measurements previously established by the goal achievement planning module, second physical measurements previously established by the section creation module, and third physical measurements measured in real-time by a plurality of sensors coupled to the physical training participant,
   wherein the management contents creation module includes:
   a movement assessment module configured to assess a movement of the physical training participant on the basis of the profile of the physical training participant and the third physical measurements measured in real-time by the sensors, the movement assessment module further including an agility assessment module configured to assess agility of the physical training participant on the basis of a variation of an amplitude of a statistical waveform of acceleration data according to time, and an endurance assessment module configured to assess endurance of the physical training participant on the basis of a ratio between an agility value at an initial time of the physical training participant and an agility value after a predetermined time period of the training, and a ratio between a heart rate at the initial time of the physical training and a heart rate after the predetermined time period of the physical training;
   a movement load adjustment module configured to adjust the movement load according to a physical condition of the physical training participant during the physical training;
   a safety module configured to establish a standard for safety for the physical training participant during the physical training on the basis of the profile of the physical training participant and the third physical measurements measured in real-time by the sensors; and
   a calorie consumption measurement module configured to assess a metabolic amount of the physical training participant on the basis of the profile of the physical training participant and the third physical measurements measured in real-time by the sensors in order to measure calories consumed during the training.

2. The system of claim 1, wherein the safety module is configured to estimate a Wet Bulb Global Temperature (WBGT) index, determine whether or not the estimated WBGT index follows an International Standardization Organization (ISO) specification, measure a heart load and a heart stress of the physical training participant according to the estimated WBGT index, and establish the standard for safety according to the measurement.

3. The system of claim 2, wherein the calorie consumption measurement module is configured to calculate a value corresponding to calories consumed per minute on the basis of information in the profile of the physical training participant, including a heart rate, gender, and weight, and integrate the value with respect to time series data of an average heart rate per minute in order to measure calorie consumption.

4. A non-transitory computer-readable media having stored thereon code for executing a method of managing physical training, the method comprising:
   establishing a training goal and a time schedule for a physical training participant on the basis of a profile including information associated with physical characteristics of the physical training participant;
   establishing initial physical measurements of the physical training participant;
   creating discrete training items on a section basis with reference to a predetermined standard according to the training goal and the time schedule for the physical training participant and setting a movement load for each section on the basis of the training goal and the time schedule for the physical training participant; and
   creating contents for managing the physical training of the physical training participant on the basis of the initial physical measurements, the time schedule for the physical training participant, the discrete training items, and various physical measurements measured in real-time by sensors attached to the physical training participant;
   assessing agility of the physical training participant on the basis of a variation of an amplitude of a statistical waveform of acceleration data according to time; and
   assessing endurance of the physical training participant on the basis of a ratio between an agility value at an initial time of the physical training of the physical training participant and an agility value after a predetermined time period of the training, and a ratio between a heart rate at the initial time of the physical training and a heart rate after the predetermined time period of the physical training.

5. The non-transitory computer-readable media of claim 4, wherein creating discrete training items further includes creating the discrete training items on the basis of an achievement level, and establishing a movement load according to the training goal and the time schedule of the physical training participant.

6. The non-transitory computer-readable media of claim 5, the method further comprising:
   assessing a movement of the physical training participant on the basis of the profile of the physical training participant and the physical measurements measured in real-time by the sensors;
   adjusting the movement load according to a physical condition of the physical training participant during the physical training;
   establishing a standard for safety for the physical training participant during the physical training on the basis of the profile of the physical training participant and the physical measurements measured in real-time by the sensors; and
   assessing a metabolic amount of the physical training participant on the basis of the profile of the physical training participant and the third physical measurements measured in real-time by the sensors in order to measure calories consumed during the training.

* * * * *